United States Patent [19]
Haight

[11] Patent Number: 5,320,168
[45] Date of Patent: Jun. 14, 1994

[54] HEAT EXCHANGE SYSTEM FOR PROCESSING SOLID PARTICULATES

[76] Inventor: Ehrick K. Haight, 103 Highland Ave., Rowayton, Conn. 06853

[21] Appl. No.: 52,175

[22] Filed: Apr. 23, 1993

[51] Int. Cl.$^5$ ............................................. F28F 3/12
[52] U.S. Cl. ..................................... 165/166; 165/920
[58] Field of Search ............................... 165/166, 920

[56] References Cited

U.S. PATENT DOCUMENTS

| | | | |
|---|---|---|---|
| 4,293,033 | 1/1981 | Nasser | 165/166 |
| 4,688,631 | 8/1987 | Peze et al. | 165/166 |
| 5,167,274 | 12/1992 | Mueller | 165/920 X |

*Primary Examiner*—John C. Fox
*Attorney, Agent, or Firm*—Schweitzer Cormman & Gross

[57] ABSTRACT

A system for heat exchange processing of particulate solid material is disclosed. The particulate solids are flowed by gravity through a housing packed with flat, internally cooled (or heated) heat exchange panels spaced apart to define generally vertical channels for the passage of the solid particulate. The panels are formed of opposed metal sheets, sealed around their edges, spot welded together in limited areas of joinder, in a predetermined pattern over their surfaces, and hydrostatically expanded in the areas between to form surfaces that are quilt-like in appearance. The panels are configured in two alternate forms such that, when a plurality of panels are assembled in a stack, the hydrostatically expanded portions of one panel are disposed opposite the areas of joinder of an adjacent panel of alternate configuration, creating a sinuous, but relatively uniform flow path for the flow of particulate solids between panels. High system efficiency is achieved by enabling adjacent panels to be spaced closer together while still avoiding the problem of "bridging" of the solid particulate material between panels.

4 Claims, 4 Drawing Sheets

HEAT EXCHANGE SYSTEM FOR PROCESSING SOLID PARTICULATES

BACKGROUND AND SUMMARY OF THE INVENTION

The present invention is directed to equipment for the processing of solid particulate materials to effect heat exchange. Most typically, the system is employed in the cooling of solid particulate materials during production processing.

It is known in the construction of heat exchange processors to employ hydrostatically expanded heat exchange panels within a heat exchange vessel, for the evaporation and concentration of liquids, for example. Such heat exchange panels are constructed by joining together a pair of sheet metal plates by welding the plates together around their peripheral edges to form a fluid tight enclosure. The facing sheets of metal are then secured together in limited areas of joinder, typically by spot welding. These areas are arranged in a predetermined uniform pattern over the entire flat surface area of the panel. For example, the areas of joinder may be a half to three quarters inch in diameter, spaced apart on, for example, four inch centers. Each panel is provided with a fluid inlet and a fluid outlet substantially spaced from each other, typically at diagonally opposite corners of the panel. The thus prepared panels are then hydrostatically expanded by forcing fluid under relatively high pressure into the interior of the panel, preferably but not necessarily while the areas of joinder are mechanically clamped together. The panel areas between the areas of joinder are permanently deformed outwardly from the central plane of the panel to provide labyrinthine internal passages for the flow of heat exchange medium inside the panel.

Heat exchange panels of the type described above are generally known. The present invention provides a unique and advantageous way of employing such panels in a heat exchange system for the processing of solid particulate material in a way to greatly increase the efficiency of the heat exchange process for such material.

In accordance with the invention, a heat exchanger system is provided which includes a heat exchange housing provided with an inlet and an outlet for flowing particulate solids. Typically, the system operates by gravity flow, with the heat exchange housing being vertically oriented, with its inlet at the top and its outlet at the bottom. The heat exchange housing is packed with a series of flat heat exchange panels, of the general type described above, vertically oriented and arranged in parallel, closely spaced relation to define a plurality of vertically oriented narrow flow paths for moving the solid particulate material through the heat exchange housing.

Because of the quilt-like modulating surface contours of the heat exchange panel, "bridging" of the solid particulate material between panels becomes a problem as the spacing between panels is reduced. Inasmuch as the efficiency of the heat exchange operation is a significant function of the spacing between adjacent panels, the efficiency of a given system for a given particulate material can be optimized by reducing the space between adjacent panels as far as possible while avoiding problems of "bridging" of the particulate materials, especially in relatively convergent areas of adjacent, opposed panels.

Pursuant to the invention, a significantly improved and efficient heat exchange system for particulate solids is provided by constructing and arranging the heat exchange panels in such manner that the hydrostatically expanded portions of one panel are positioned directly opposite the areas of joinder of each adjacent panel. This provides, between each pair of panels, a passage of a sinuous character but with significantly greater uniformity of width over the entire surface areas of the plates. By minimizing areas of convergence, an adjacent pair of heat exchange panels may be moved closer together, for greater heat exchange efficiency, without exacerbating the problem of bridging of the particulate solids flowing through the system.

The structure of the invention is advantageously achieved by constructing the panels to be of two types. In a first alternate panel type, the areas of joinder are arranged in a first predetermined pattern. In a second alternate panel type, the configuration of the areas of joinder, is offset such that each area of joinder lies substantially midway between corresponding areas of joinder of the first alternate panels. When a series of alternate types of panels are assembled in a stack, the spacing between panels can be significantly reduced without causing bridging of the solid particulate material. This has two important advantages: First, because adjacent heat exchange panels are closely spaced, there is greater efficiency of heat transfer between the plates and a mass of flowing particulate solid material flowing there between. Secondly, the closer spacing of the panel allows for a greater number of the panels to be assembled in a housing of given size.

For a more complete understanding of the above and other features and advantages of the invention, reference should be made to the following detailed description of a preferred embodiment of the invention and to the accompanying drawings.

DESCRIPTION OF PREFERRED EMBODIMENTS

Figure 1:
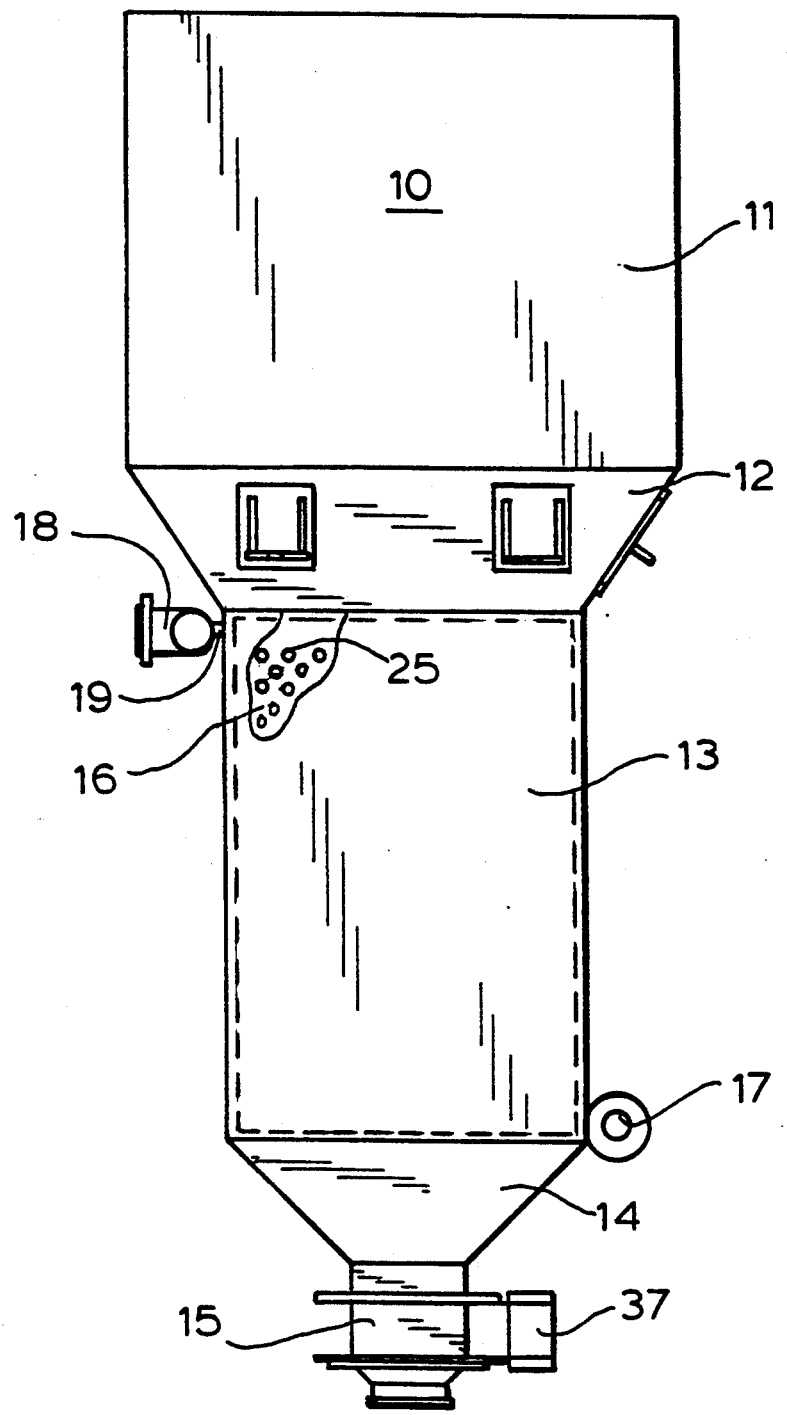
FIG. 1 is a front elevational view of a heat exchange processor designed in accordance with the invention for cooling particulate solids.

Referring now to the drawing, illustrating a typical system in which the invention may be employed, the reference numeral 10 designates generally a heat exchange system for receiving particulate solid material for heat exchange processing. It is to be particularly understood that the invention is not in any way limited to a particular solid particulate material, or to a particular size of such material. The specifically illustrated system, however, would be suitable for treatment of, for example, a material such as alumina catalyst beads having a particle size on the order of ⅛ inch–3/16 inch. The system 10 includes a receiving hopper 11, which receives the material from a preceding processing operation. In the illustrated example, the incoming particulate material, is at an elevated temperature, and the heat exchange process is designed to remove heat.

The hopper 11, includes a funnel section 12 in its lower portion, which discharges into the open upper end of a heat exchange housing 13, advantageously of generally rectangular cross sectional configuration. The system 10, which is supported by a structure 14, is designed for the continuous flow through of the particulate solids, with the solid material passing vertically downward through the heat exchange housing 13, through a funnel discharge portion 14 and out through an outlet 15.

Figure 2:
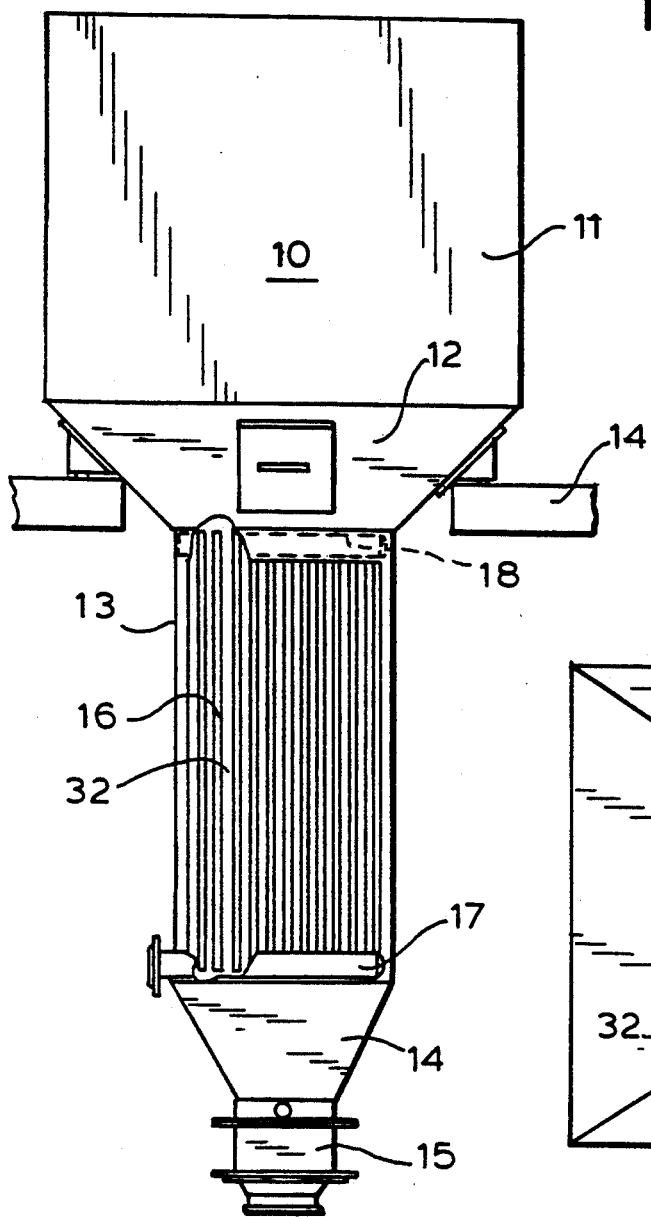
FIG. 2 is a side elevational view of the system of FIG. 1.
Figure 3:
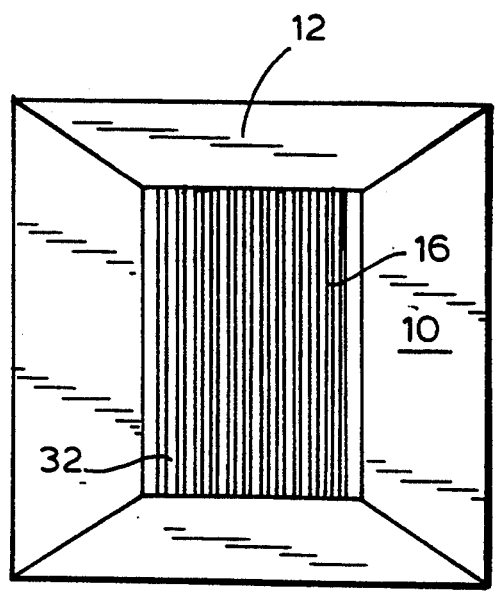
FIG. 3 is a top plan view of the system.

Installed within the heat exchange housing 13 is a stack of heat exchange panels 16. In the illustrated form of the invention, the heat exchange panels 16 are flat, generally rectangular in configuration, vertically oriented, and arranged in a uniformly spaced, parallel manner throughout substantially the whole of the interior area of the heat exchange housing 13. As is evident in FIGS. 2 and 3, the multiplicity of heat exchange panels 16 form a plurality of narrow vertical passages through the heat exchange housing 13, and the particulate solid material entering the hopper 11 is confined to flow in these narrow passages, between individual heat exchange panels, as it passes downwardly through the heat exchange housing 13. If necessary or desirable, a degree of vibratory agitation may be applied to one or more elements of the structure 10 to expedite the flow of particulate material through the system.

To advantage, headers 17, 18 are mounted on the outside of the heat exchange enclosure 13. Each of the headers is provided with a plurality of individual conduit 19 (see FIG. 1), each communicating with an individual heat exchange panel. In the illustrated system, which is designed for cooling of hot particulate material, the lower header 17 constitutes an inlet header, while the upper header 18 serves as an outlet header. Cooling is supplied to the intake header 17 and serves through a plurality of individual conduits (not specifically illustrated) to supply cooling water to lower portions of each of the heat exchange panel 16. Likewise, the outlet header 18 receives discharge flow of cooling water from each of the individual panels and is connected to suitable discharge conduit means (not shown).

Figures 4, 5:
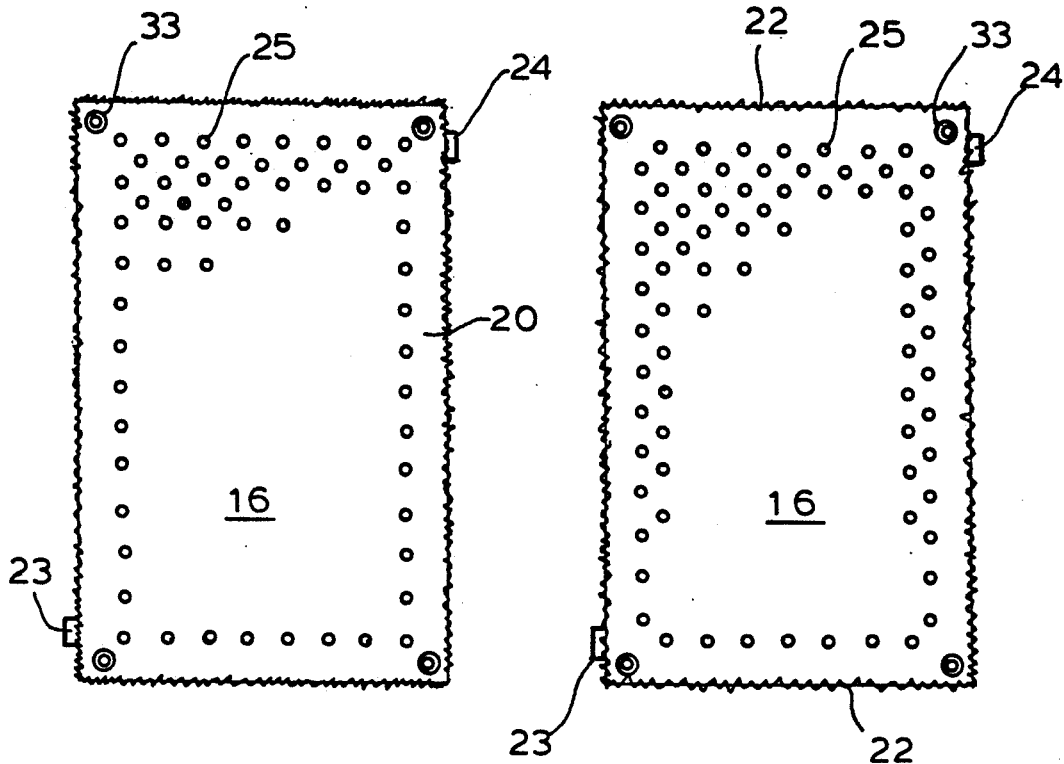
FIGS. 4 and 5 are elevational views of first and second alternate heat exchange panels constructed according to the invention.
Figure 6:
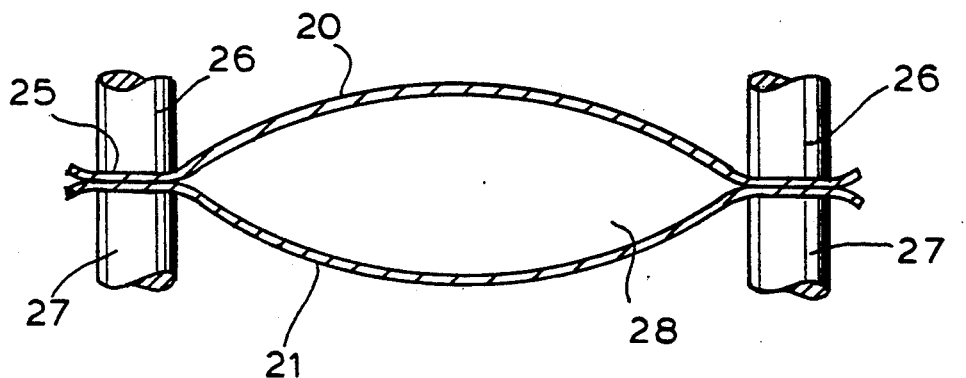
FIG. 6 is an enlarged, fragmentary cross sectional view as taken generally on line 6—6 of FIG. 4, illustrating the cross sectional configuration of the heat exchange panels and the manner of their manufacture.

To advantage, the individual heat exchange panels 16, shown in FIGS. 4–6, are of a generally known construction, comprised of a pair of generally flat, thin metal plates 20, 21 which are positioned in face-to-face relation and secured together by a peripheral weld bead 22 around all four sides which seals the interior space between the two sheets. Inlet and outlet fittings 23, 24 are mounted in the panels at diagonally opposite corners to provide for ingress and egress of fluid heat exchange medium.

Generally over the entire surface area of the panels, but at spaced apart locations, there are provided areas 25 of joinder, where the two sheets 20, 21 are secured together. This is advantageously done by a spot welding process, to provide areas of, for example, ¾ of an inch in diameter where the two sheets are firmly joined. The areas of joinder 25 may be arranged in, for example, horizontal rows, spaced apart a suitable distance, say four inches. In an adjacent row, the areas of joinder may be offset at half the distance of the normal spacing between areas of joinder. This or a similar regular pattern of areas of joinder is repeated over the entire surface area of the panels. Thereafter, and preferably while the areas of joinder are mechanically restrained by clamping elements 26, 27, as reflected in FIG. 6, the interior space of the panel is subjected to sufficient hydrostatic pressure to deform outwardly the areas of the metal sheets 20, 21 in the regions between the areas of joinder 25. In a typical panel of, for example, two feet by ten feet on a side with three quarter inch areas of joinder spaced approximately four inches, the hydrostatic expansion of the panel may produce an open area 28 within the panel having a thickness of, for example, ¼–⅜ of an inch in thickness. As will be understood, although the heat exchange panels 16, after hydrostatic expansion in the manner indicated, retain a generally flat overall configuration, the surface contours are relatively uniformly undulating and somewhat quilt-like in appearance, while providing sinuous and divided internal passages for the heat exchange medium to flow between the inlet and outlet fittings.

Figures 7, 8:
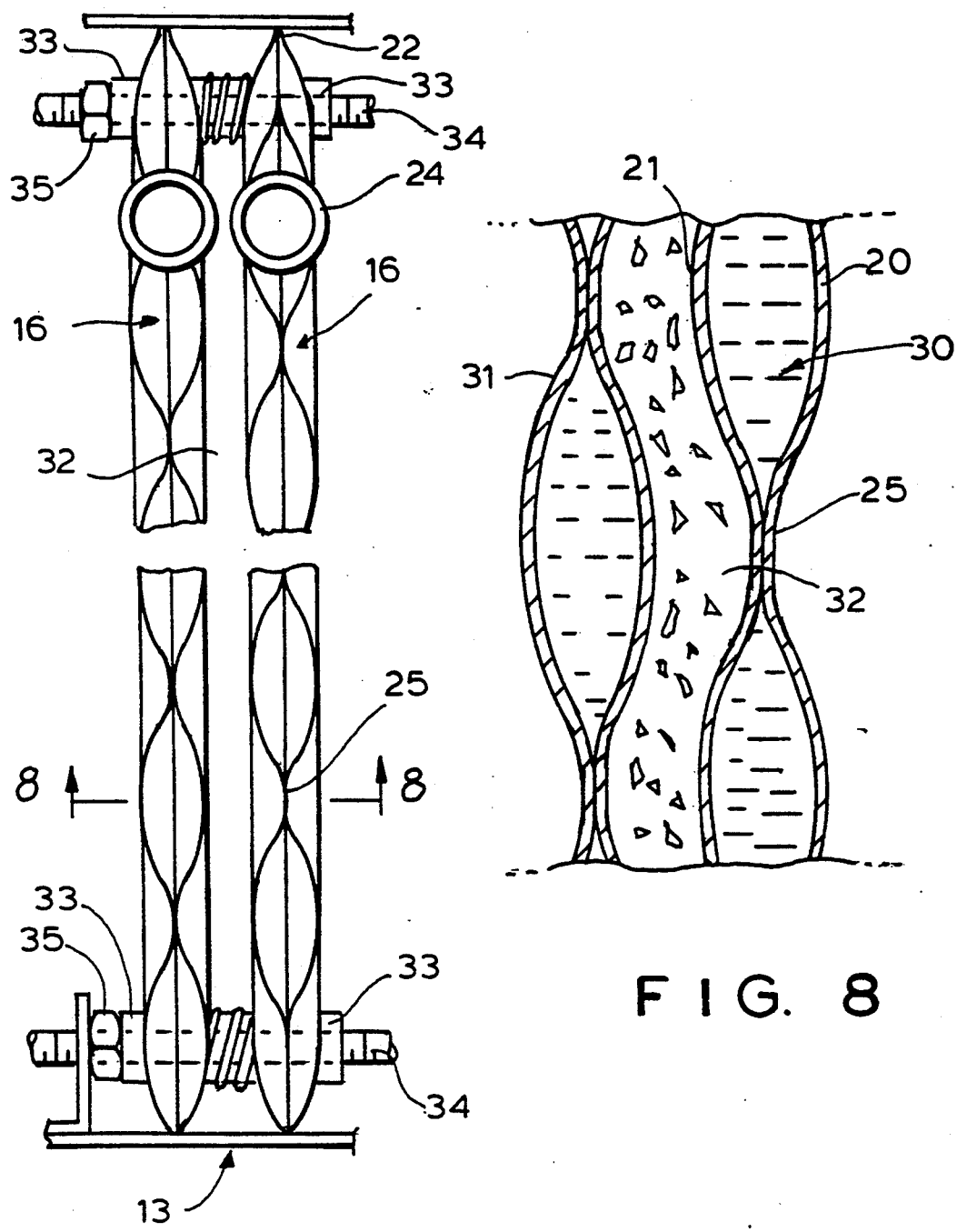
FIG. 7 is a fragmentary cross sectional view, as taken at line 7—7 of FIG. 2.
FIG. 8 is an enlarged fragmentary cross sectional view, as taken at line 8—8 of FIG. 7.

In accordance with a feature of the invention, operating efficiency of the unit is significantly improved by providing a series of heat exchange panels 16 in a first and second alternate configuration, as shown in FIGS. 4 and 5, in which the hydrostatically expanded areas of each panel of a first alternate type are aligned opposite areas of joinder 25 of a second alternate type. Thus, in the enlarged illustration of FIG. 8, areas 29 of hydrostatic enlargement of a panel 30 are arranged directly opposite areas of joinder 25 of an opposing panel 31, such that the generally vertical passage 32 extending downwardly between each adjacent pair of heat exchange panels, is, to the greatest practical extent, of uniform width. Exact uniformity is, as a practical matter, not achievable. However, as compared to an assembly of panels of all like construction, a major improvement is realized in the objective of bringing adjacent panels as close together as possible, without incurring the risk of excessive "bridging" of the particulate material between adjacent panels.

In accordance with one aspect of the invention, the spacing between adjacent heat exchange panels 16 normally can be fixed for a given material, although the determination of such optimum spacing may well have to be done empirically by progressively reducing spacing for a given material until bridging between panels becomes a problem.

To advantage, mounting and spacing of the heat exchange panels can be accomplished by providing transverse tubular sleeves 33 passing through the panels in each corner area and sealed by welding an entire assembly of as many panels as is necessary and appropriate to occupy the heat exchange housing 13 is secured rigidly and in desired spacing by means such as a threaded rod 34 passing through a succession of sleeves at each of the corners and secured at each end by nuts 35. Spacing between adjacent heat exchange panels 16 may be established by the length of the sleeves 33, or additional spacers (not shown) may be inserted in between. To advantage, compressible coil springs 36 may be inserted between panels during assembly. If a bridging of the particulate matter occurs, it may be corrected easily by temporarily loosening the nuts 35 to allow the springs 36 to separate the panels slightly and thus free the material.

For processing of different solid particulate materials in a given system, provision can be made for re-spacing of the panels as necessary, or for bodily replacing a complete assembly of heat exchange panels. For most operations, however, the material being processed is a constant, and once its attributes have been established empirically, and the spacing between adjacent heat exchange panels optimally established, further changes are not required.

In the operation of the system, a constant supply of particulate material is provided at the hopper 11 and means, such as a vibratory agitator 37 at the discharge outlet 15, are provided for controlling the rate of material discharge. This enables the dwell time of the particulate material in contact with the heat exchange panels 16 to be controlled, so that a desired degree of heating or cooling may be effected.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. In a heat exchange system for processing particulate solids and of the type comprising a housing having an inlet opening at one end and an outlet opening at an opposite end, and a plurality of heat exchange panels arranged in parallel, side-by-side relation in said housing and being spaced apart to form a plurality of parallel flow paths from said inlet opening to said outlet opening, the improvement characterized by
   (a) said heat exchange panels each being comprised of a pair of generally flat sheet metal plates arranged in face-to-face manner and secured in sealed relation about their peripheries to form a fluid tight enclosure provided with a fluid inlet at a first location and a fluid outlet at a second location spaced remotely from said first location,
   (b) the individual plates of said heat exchange panels being joined in limited predetermined areas of joinder in a predetermined regular pattern and said panels having been hydrostatically expanded in a thickness direction in regions between said areas of joinder to form enlarged interiors of said panels to accommodate the flow of heat exchange medium,
   (c) first alternate ones of said heat exchange panels having areas of joinder located generally equidistantly between areas of joinder of second alternate ones of said heat exchange panels whereby, in an assembly of heat exchange panels comprised of first alternate panels interposed between each pair of second alternate panels, hydrostatically expanded portions of each panel are generally directly opposed to areas of joinder of an adjacent panel to form sinuous passageways of relatively uniform thickness between adjacent panels,
   (d) said panels being spaced uniformly apart to define a plurality of narrow sinuous passageways for the flow of particulate solids,
   (e) the width of said passageways being greater than the particle size of said particulate solids, and not substantially greater than necessary to avoid bridging of said particulate solids between adjacent panels, to facilitate maximum transfer of heat between said particulate solids and heat exchange medium within said panels.

2. A heat exchange system according to claim 1, wherein
   (a) hollow sleeves passing through said panels in sealed relation at the corners thereof,
   (b) rods passing through a plurality of said sleeves for securing a plurality of panels together, and
   (c) means including said sleeves for retaining said panels in predetermined spaced relation.

3. A heat exchange system according to claim 2, wherein
   (a) spring means are interposed between adjacent panels, normally urging said panels apart.

4. In a heat exchange system for processing particulate solids and of the type comprising a housing having an inlet opening at one end and an outlet opening at an opposite end, and a plurality of heat exchange panels arranged in parallel, side-by-side relation in said housing and being spaced apart to form a plurality of parallel flow paths from said inlet opening to said outlet opening, the improvement characterized by
   (a) said heat exchange panels each being comprised of a pair of sheet metal sections arranged in face-to-face manner to form a fluid tight enclosure provided with a fluid inlet at a first location and a fluid outlet at a second location spaced remotely from said first location,
   (b) the individual sheet metal sections of said heat exchange panels being deformed to be close together in limited first predetermined areas in a predetermined pattern and being spaced farther apart in second predetermined areas, located between said first predetermined areas, to form enlarged interiors of said panels to accommodate the flow of heat exchange medium,
   (c) first alternate ones of said heat exchange panels having said first predetermined areas located generally equidistantly between said first predetermined areas of second alternate ones of said heat exchange panels whereby, in an assembly of heat exchange panels comprised of first alternate panels interposed between each pair of second alternate panels, first predetermined areas of each panel are generally directly opposed to second predetermined areas of an adjacent panel to form sinuous passageways of relatively uniform thickness between adjacent panels,
   (d) said panels being spaced uniformly apart to define a plurality of narrow sinuous passageways for the flow of particulate solids,
   (e) the width of said passageways being greater than the particle size of said particulate solids, and not substantially greater than necessary to avoid bridging of said particulate solids between adjacent panels, to facilitate maximum transfer of heat between said particulate solids and heat exchange medium within said panels.

* * * * *